United States Patent
Berke et al.

(10) Patent No.: US 10,445,255 B2
(45) Date of Patent: *Oct. 15, 2019

(54) SYSTEM AND METHOD FOR PROVIDING KERNEL INTRUSION PREVENTION AND NOTIFICATION

(71) Applicant: DELL PRODUCTS, LP, Round Rock, TX (US)

(72) Inventors: Stuart Allen Berke, Austin, TX (US); Mi Wang, Fremont, CA (US); Vivek Dharmadhikari, San Jose, CA (US)

(73) Assignee: Dell Products, LP, Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/634,992

(22) Filed: Jun. 27, 2017

(65) Prior Publication Data
US 2017/0293574 A1   Oct. 12, 2017

Related U.S. Application Data

(63) Continuation of application No. 14/577,367, filed on Dec. 19, 2014, now Pat. No. 9,703,725.

(51) Int. Cl.
| | |
|---|---|
| G06F 12/00 | (2006.01) |
| G06F 12/14 | (2006.01) |
| G06F 12/0817 | (2016.01) |
| G06F 12/0868 | (2016.01) |
| G06F 12/1081 | (2016.01) |
| G06F 13/24 | (2006.01) |
| G06F 9/46 | (2006.01) |

(52) U.S. Cl.
CPC ...... *G06F 12/1441* (2013.01); *G06F 12/0828* (2013.01); *G06F 12/0868* (2013.01); *G06F 12/1081* (2013.01); *G06F 13/24* (2013.01); *G06F 9/467* (2013.01); *G06F 2212/1016* (2013.01); *G06F 2212/1052* (2013.01); *G06F 2212/621* (2013.01)

(58) Field of Classification Search
None
See application file for complete search history.

(56) References Cited

U.S. PATENT DOCUMENTS

| | | |
|---|---|---|
| 8,504,839 B2 | 8/2013 | Krig |
| 2003/0149796 A1* | 8/2003 | Emerson ............ H04L 63/10 709/250 |

(Continued)

*Primary Examiner* — Daniel D Tsui
(74) *Attorney, Agent, or Firm* — Larson Newman, LLP (57) ABSTRACT

A memory protection module includes comparison logic that has a write-once window CSR that stores a memory address range, and window protection logic. The comparison logic receives a memory write transaction, determines a memory address of the memory write transaction, and provides an indication as to whether or not the memory address is included in the memory address range. The window protection logic receives the memory transaction receives the indication from the comparison logic, allows the memory write transaction to proceed in response to the indication indicating that the memory address is not included in the memory address range, and drops the memory write transaction in response to the indication indicating that the memory address is included in the memory address range.

19 Claims, 5 Drawing Sheets

(56) References Cited

U.S. PATENT DOCUMENTS

| | | |
|---|---|---|
| 2004/0255162 A1 | 12/2004 | Kim et al. |
| 2010/0107249 A1* | 4/2010 | Krig ........................ G06F 21/57 |
| | | 726/22 |
| 2013/0097356 A1 | 4/2013 | Dang et al. |
| 2014/0075555 A1 | 3/2014 | Shilimkar |
| 2014/0164718 A1 | 6/2014 | van Schaik et al. |
| 2015/0254017 A1* | 9/2015 | Soja ...................... G06F 3/0622 |
| | | 711/103 |

* cited by examiner

SYSTEM AND METHOD FOR PROVIDING KERNEL INTRUSION PREVENTION AND NOTIFICATION

CROSS-REFERENCE TO RELATED APPLICATION

This application is a continuation of U.S. patent application Ser. No. 14/577,367 entitled "System and Method for Providing Kernel Intrusion Prevention and Notification," filed on Dec. 19, 2014, the disclosure of which is hereby expressly incorporated by reference in its entirety.

FIELD OF THE DISCLOSURE

This disclosure generally relates to information handling systems, and more particularly relates to providing kernel intrusion prevention and notification.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
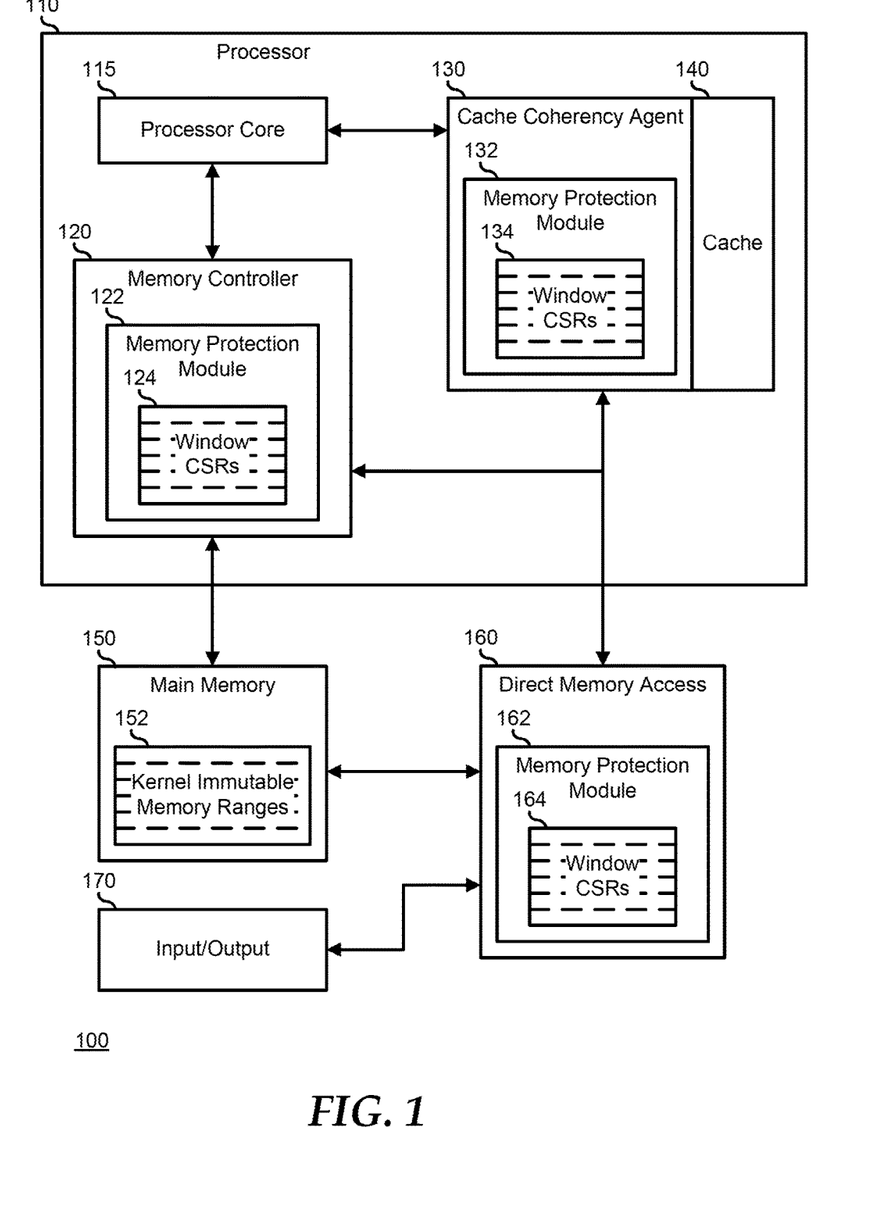
FIG. 1 is a block diagram illustrating an information handling system with several memory protection modules according to an embodiment of the present disclosure.

FIG. 1 illustrates an embodiment of an information handling system 100. For purpose of this disclosure information handling system 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes a processor 110, a main memory 150, a direct memory access (DMA) controller 160, and an input/output (I/O) device 170. Processor 110 represents a Central Processing Unit (CPU) that operates to execute machine-executable code to perform various tasks and to run various programs under the management and direction of an operating system kernel, and includes one or more processor core 115, one or more memory controller 120, and one or more cache coherency agent 130 associated with one or more cache 140. Processor 110 implements a particular processor architecture that has an associated instruction set architecture. An example of a processor architecture includes an X86 processor architecture, such as a processor manufactured by Intel Corporation or Advanced Micro-Devices, an ARM processor architecture, a Power Architecture processor architecture, a SPARC processor architecture, a MIPS processor architecture, another processor architecture, or the like.

Main memory 150 provides for data storage and retrieval for information handling system 100, and includes memory locations that store the operating system kernel. In a particular embodiment, multiple memory ranges 152 store portions of the operating system kernel that are designated as being immutable. For example, an immutable portion of the operating system kernel can include code for implementing the basic functionality of the operating system, and that can be the target of various malicious attacks in order to gain control and to subvert the functionality of information handling system 100, such as rootkits, Trojans, viruses, malware, or other unwanted code.

Memory controller 120 includes a memory protection module 122 that further includes multiple memory window control status registers (CSRs) 124. Each window CSR is associated with, and defines a corresponding memory range 152, such that the memory ranges are protected from all writes after an initial setup and loading of the contents of the memory ranges and the windows CSRs, as described below. In particular, memory protection module 122 operates to detect the memory address of a memory transaction between processor core 115 and main memory 150, and to determine if the memory transaction is a write to one of memory ranges 152. If the memory transaction is not a memory write to one of memory ranges 152, then memory protection module 120 permits the memory transaction to proceed without interruption. That is, if the memory transaction is not targeted to one of memory ranges 152, then the memory transaction is permitted to proceed, regardless of whether the memory transaction is a read or a write. Further, if the memory transaction is targeted to one of memory ranges 152, but the memory transaction is a memory read, then the memory transaction is permitted to proceed. On the other hand, if the memory transaction is a memory write to one of memory ranges 152, the memory transaction is dropped, that is, the memory transaction is not processed. In this way, the contents of memory ranges 152 is rendered immutable, and is thus protected from the ill effects of malicious attacks on the operating system kernel. In a particular embodiment, window CSRs 124 store the physical address range of memory ranges 152. Here, window CSRs 124 can include a starting physical address and an ending physical address for each memory range 152. In another embodiment, window CSRs 124 store a starting physical address, and a memory range length that describes the size of the associated memory range 152. An example of a memory range can include a number of memory units, such as memory locations, cache lines, or the like, or can include a number of blocks of memory ranges, such as a block of 512 memory locations, a block of 1 kilobyte (kB) memory locations, or another block size, as needed or desired. In another embodiment, window CSRs 124 store a variety of alternate or additional addressing information and fields including subsystem owner bits, source/target ID bits, cache coherency agent ID bits, memory/IO space bits, partition ID bits, other information that maps to a specific physical memory region, or the like, as needed or desired.

Cache coherency agent 130 also includes a memory protection module 132, similar to memory protection module 122 and that includes an analogous set of window CSRs 134. Note that, in normal operation, code from one or more of memory ranges 152 can be stored in cache 140. Here, memory protection module 132 operates to detect the memory address of a memory transaction between processor core 115 and cache 140, to determine if the memory transaction is a write to one of memory ranges 152, as stored in the cache, and if the memory transaction is a memory write targeted to one of the memory ranges in the cache, to drop the memory transaction. In this way, the contents of memory ranges 152 is further rendered immutable, even when the contents of the memory ranges are stored in cache 140. Note that, in general, window CSRs in a memory controller, a cache controller, a DMA controller, or the like may not be identical, as the contents may be architecture dependent. For example, subsystems may "see" the same physical address differently based on how they view and access memory, or may only see a portion of the overall memory space. For instance, a memory controller may only receive memory requests to it's own address range, and so may not receive all possible physical address bits (others are stripped out when sending a command to the memory controller that owns the memory range).

DMA controller 160 also includes a memory protection module 162, similar to memory protection module 122 and that includes an analogous set of window CSRs 164. Note that, in normal operation, DMA controller 160 operates to offload from processor 110 the processing of certain memory transaction between I/O device 170 and main memory 150. As such, DMA controller 160 can access code from one or more of memory ranges 152. Here, memory protection module 162 operates to detect the memory address of a memory transaction between processor I/O device 170 and main memory 150, to determine if the memory transaction is a write to one of memory ranges 152, and if the memory transaction is a memory write targeted to one of the memory ranges, to drop the memory transaction. In this way, the contents of memory ranges 152 is still further rendered immutable during DMA transactions. In another embodiment, where IO device 170 maintains its own page tables or virtual address translation tables, window CSRs 124 may include a combination of physical addresses, virtual addresses, virtual to physical translation tables, page translation tables, or other suitable mechanisms that map the IO device access address to a system physical address.

It will be recognized that other elements of an information handling system similar to information handling system 100 will possibly have unrestricted access to a system main memory without having to go through one of the memory transaction agents described above, that is, memory controller 120, cache coherency agent 130, or DMA controller 160. In particular, such other elements can have access to memory ranges that include operating system kernel code. An example of such elements includes a hardware BIST (Built-In Self-Test) engine in various information handling system subsystems, processors, or devices, an out-of-band systems management subsystems such as a Baseboard Management Controller (BMC) or an Integrated Dell Remote Access Controller (IDRAC), a hardware diagnostic engine in various information handling system subsystems, processors, or devices, or the like. In such cases, it will be recognized that the addition of a memory protection module similar to one of memory protection modules 122, 132, or 162 can be implemented in the other elements in order to further render the memory ranges associated with the operating system kernel immutable. As such, the system and methods as described herein are not limited to a particular processor architecture, system configuration, or implementation as illustrated above, or as further described below, but are broadly applicable to a wide range of processor architectures, system configurations, and implementations, as needed or desired.

In a particular embodiment, when information handling system 100 is initialized, via a hardware reset or via a power-on reset, the information handling system operates from a known root of trust, such as a signed and authenticated boot code. For example, a Basic Input/Output System (BIOS), a Unified Extensible Firmware Interface (UEFI), or the like, can reside in a hardware secure memory location, such as a BIOS Read-Only Memory (ROM) or a Non-Volatile Random Access Memory (NV-RAM), and the boot code can be authenticated as being unadulterated, such as by verifying a hash of the boot code. The boot code performs various initialization operations to prepare information handling system 100 to pass control to the operating system kernel. Then, the boot code executes the operating system loader portion of the boot code to install the operating system kernel in main memory 150. In another embodiment, the number of immutable regions and information about each immutable region, such as start/end physical address may be determined by reading the operating system kernel header loaded in main memory 150. In a particular embodiment, the operating system kernel is also authenticated.

The boot loader operates to load the operating system kernel into main memory 150, to determine the memory ranges of the operating system kernel that are to be immutable, to program window CSRs 124, 134, and 164, and to lock the window CSRs such that, during normal operation, the contents of the window CSRs cannot be altered. In particular, the only time that window CSRs 124, 134, and 164 can be written is during the boot process after a hardware reset or a power-on reset. In a particular embodiment, each of window CSRs 124, 134, and 164 is architected as write-once registers of processor 110 that is cleared in response to a hardware reset or a power-on reset, and that is locked in response to a first register write operation to the window CSR. In another embodiment, window CSRs 124, 134, and 164 remain rewriteable until such time as a separate lock operation is performed that locks all of the window CSRs at the same time.

In a particular embodiment, when memory protection module 122, 132, or 162 drops a memory transaction, the memory protection module also provides an indication that a memory transaction has been dropped. For example, the indication can include an interrupt to processor 110, a machine check exception, or the like, that invokes an exception handler that determines which thread attempted a write to an immutable memory range 152 and that shuts down the thread. For example, the exception handler can determine the process identification (PID) or thread identification of the offending process, and can further identify the intrusion based upon the identification. In a particular embodiment, the provision of the indication that the memory transaction has been dropped is based upon a selectable option. For example, the option to provide the indication can be selectable via a BIOS or UEFI setup routine. Here, the ability to select or deselect the option to provide the indication can be lockable, such that the provision of the indication cannot be tampered with, as well. In another embodiment, where information handling system 100 represents a server system or other managed system, memory protection modules 122, 132, and 162 provide an indication that a memory transaction has been dropped to an Intelligent Platform Management Interface (IPMI) controller, such as a Baseboard Management Controller (BMC) or an Intelligent Dell Remote Access Controller (IDRAC), and the IPMI controller logs the event and provides the log to a management system that is connected to the information handling system.

In a particular embodiment, after window CSRs 124, 134, and 164 are locked, memory protection modules 122, 132, and 162 provide an indication when an attempt is made to re-write one or more of the window CSRs. For example, the indication can include an interrupt to processor 110, a machine check exception, or the like, that invokes an exception handler that determines which thread attempted a re-write one or more of window CSRs 124, 134, and 164 and that shuts down the thread. For example, the exception handler can determine the process identification (PID) or thread identification of the offending process, and can further identify the intrusion based upon the identification. In a particular embodiment, the provision of the indication that one or more of window CSRs 124, 134, and 164 were attempted to be re-written is based upon a selectable option. For example, the option to provide the indication can be selectable via a BIOS or UEFI setup routine. Here, the ability to select or deselect the option to provide the indication can be lockable, such that the provision of the indication cannot be tampered with, as well. In another embodiment, where information handling system 100 represents a server system or other managed system, memory protection modules 122, 132, and 162 provide an indication that one or more of window CSRs 124, 134, and 164 were attempted to be re-written to an Intelligent Platform Management Interface (IPMI) controller, such as a Baseboard Management Controller (BMC) or an Intelligent Dell Remote Access Controller (IDRAC), and the IPMI controller logs the event and provides the log to a management system that is connected to the information handling system In a particular embodiment, information handling system 100 provides a hardware based circumvention to the immutability of window CSRs 124, 134, and 164 for the purposes of debugging the operating system, itself, or other code that is facilitated by the ability to monitor and change the operating system kernel, such as by adding checkpoints to the operating system kernel. Here, a manufacturing or debug version of the information handling system can include one or more hardware features that permit the writing to memory ranges 152. For example, a particular hardware debug related device, such as a resistor, an integrated circuit (IC) like a JTAG device, or the like, can be installed for the purpose of manufacturing and debug, and then the device can be removed for product shipment. In another example, a motherboard of information handling system 100 can include a break-away portion that includes circuit traces or components that enable the debug mode, and that can be broken off from the motherboard prior to product shipment. In another example, the motherboard can include a fuse that is configured such that the debug mode is permitted when the fuse is intact, and that the debug mode is disabled when the fuse is blown.

It will be recognized that certain multi-core CPUs support a hard partitioning, where an N-core processor is subdivided into M separate processing environments, where M is less than or equal to N. Here, such a multi-core CPU can include partition CSRs that isolate the memory regions associated with the different processing environments, and can perform memory checking against the partition CSRs to ensure that memory operations for one processing environment are not allowed to be performed on a different processing environment. In a particular embodiment, such a multi-core CPU can further include window CSRs that further limit the memory operations such that writes to the operating system kernel in any of the processing environments is prevented.

In a particular embodiment, where one or more of processor 110, and more particularly processor core 115, memory controller 120, and cache coherency agent 132, operates utilizing a deep memory access pipeline of many clock cycles, the memory transaction checking as performed by memory protection module 122 or 132 can be performed in parallel with other pipeline operations, such that the memory transaction checking adds little or no latency to the operation of the memory access. In another embodiment, where the memory transaction checking performed by memory protection modules 122, 132, and 142 adds latency, the functionality of the memory protection modules can be based upon a selectable option. For example, the option to provide memory transaction checking can be selectable via a BIOS or UEFI setup routine. In a particular embodiment, memory protection module 122 includes a sufficient number of window CSRs to cover all of the immutable memory ranges that are needed by an operating system kernel. For example memory protection module 122 can include eight (8) window CSRs, sixteen (16) window CSRs, or another number of window CSRs, as needed or desired.

As illustrated, memory protection modules 122, 132, and 162 are integrated within one or more elements of information handling system 100, but this is not necessarily so. In another embodiment, information handling system 100 can include one or more additional elements that function as a memory protection module as described above. For example, a custom or semi-custom System-On-a-Chip (SOC), or Field Programmable Gate Array (FPGA) can be configured to perform the functions and include the features of memory protection modules 122, 132, and 162, as described above.

Figure 2:
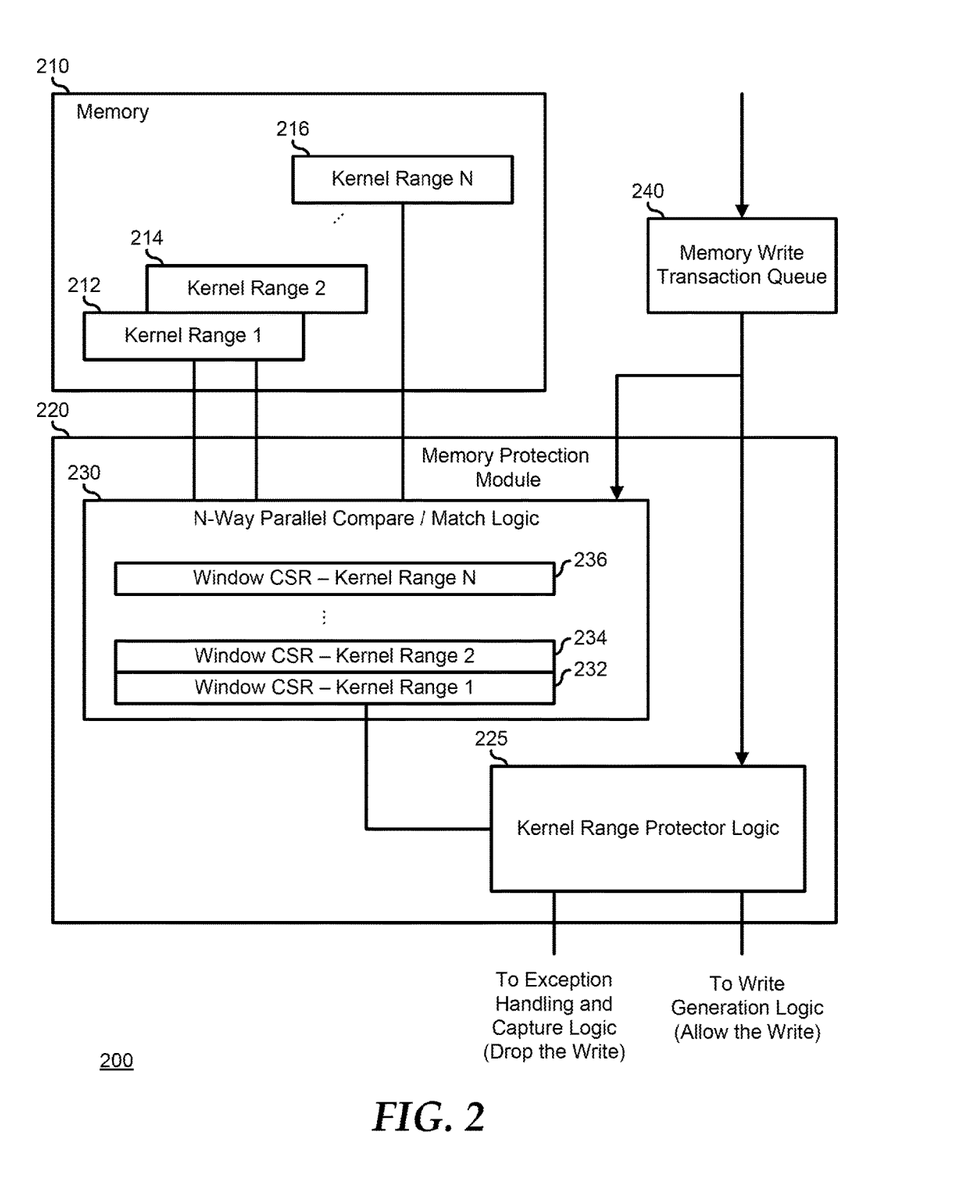
FIG. 2 is a block diagram illustrating a memory protection module according to an embodiment of the present disclosure.

FIG. 2 illustrates an information handling system 200 including a memory 210 similar to main memory 150, a memory protection module 220 similar to one or more of memory protection modules 122, 132, or 162, and a memory write transaction queue 240. Memory protection module 220 includes a kernel range protector logic 225 and an N-way parallel compare/match logic 230 that includes N window CSRs 232, 234, and 236. When information handling system 200 is booted, memory 210 is loaded with N regions of operating system kernel code in memory ranges 212, 214, and 216, and window CSRs 232, 234, and 236 are loaded with the memory range information for the memory ranges and are locked against being rewritten. In operation, memory write transactions are provided from memory write transaction queue 240 to N-way parallel compare/match logic 230 to determine if the write transactions are targeted to one of memory ranges 212, 214, and 216, and the memory write transactions are also provided to kernel range protector logic 225. If the memory write transactions are not targeted to one of memory ranges 212, 214, and 216, N-way parallel compare/match logic 230 provides an indication to kernel range protector logic 225 that the memory write transactions are not targeted to one of the memory ranges, and the kernel range protector logic permits the memory write transactions to proceed to the memory write generation logic of the processor or other agent of information handling system 200. If the memory write transactions are targeted to one of memory ranges 212, 214, and 216, N-way parallel compare/match logic 230 provides an indication to kernel range protector logic 225 that the memory write transactions are targeted to one of the memory ranges, and the kernel range protector logic drops the memory write transactions and invokes the exception handling and capture logic of the processor or other agent of information handling system 200.

Figure 3:
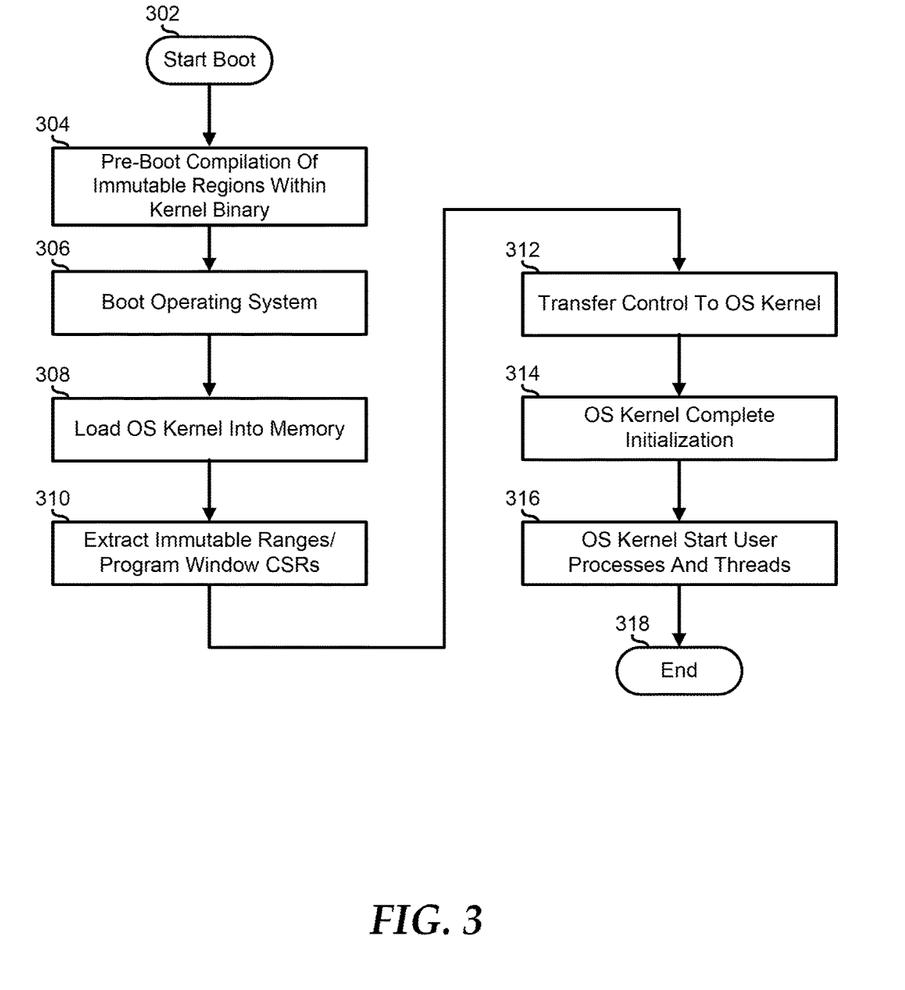
FIG. 3 is a flowchart illustrating a method of initializing a memory protection module according to an embodiment of the present disclosure.

FIG. 3 illustrates a method of initializing a memory protection module, starting at block 302. The immutable regions of an operating system kernel are compiled by the pre-boot environment in block 304, and the boot loader starts the operating system boot in block 306. The boot loader loads the operating system kernel into memory in block 308, extracts the immutable memory ranges and programs the window CSRs in block 310, and transfers control to the operating system kernel in block 312. The operating system kernel completes initialization of the information handling system in block 314 and starts the user processes and threads in block 316.

Figure 4:
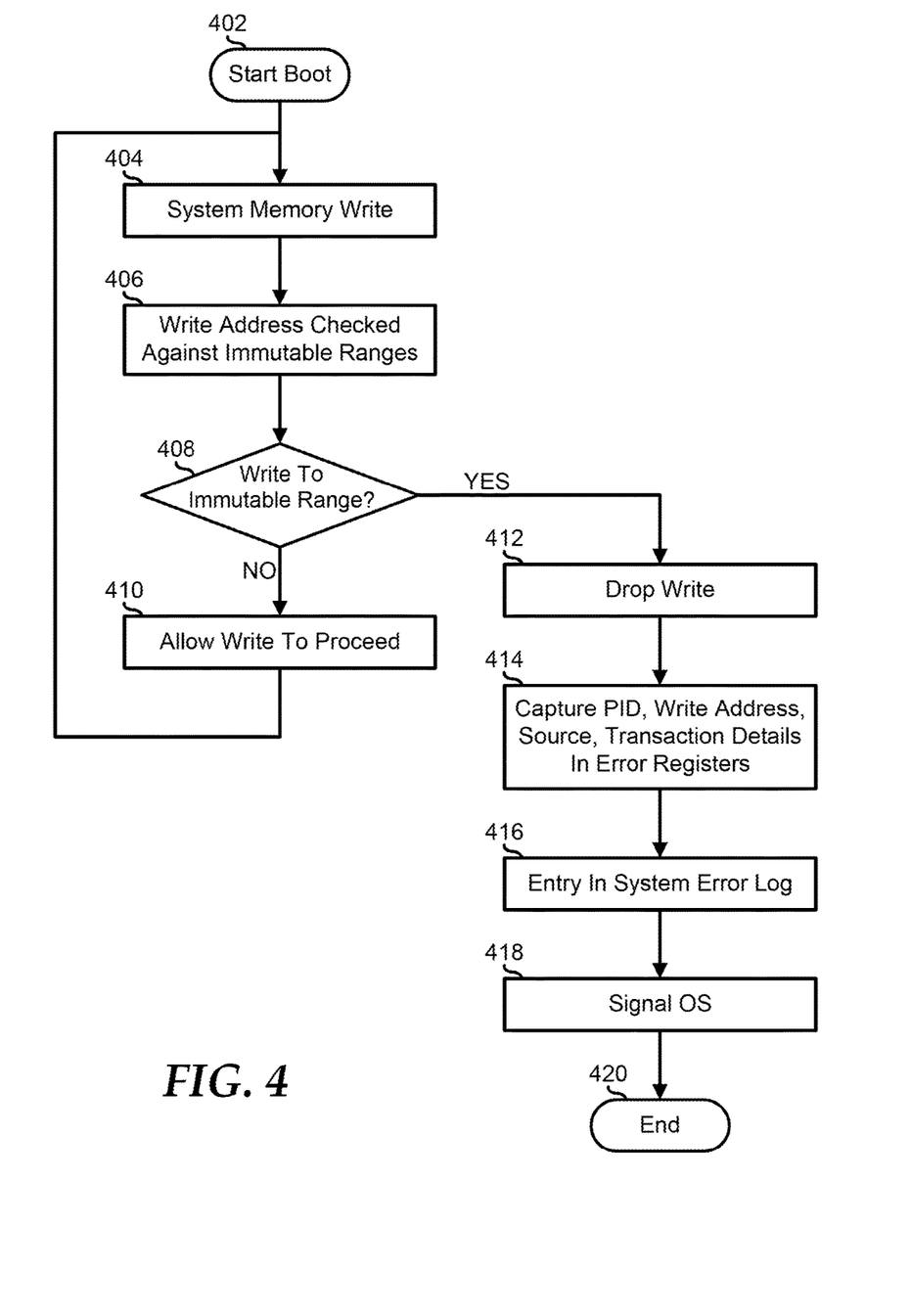
FIG. 4 is a flowchart illustrating a method of providing kernel intrusion prevention and notification according to an embodiment of the present disclosure.

FIG. 4 illustrates a method of providing kernel intrusion prevention and notification starting at block 402. A system memory write is queued in block 404, and a memory protection module checks the write address for the memory write against the immutable memory ranges in the window CSRs in block 406. A decision is made as to whether or not the write address for the memory write is in one of the immutable memory ranges in decision block 408. If not, the "NO" branch of decision block 408 is taken, the memory write is permitted to proceed in block 410, and the method returns to block 404 where another system memory write is queued.

If the write address for the memory write is in one of the immutable memory ranges, the "YES" branch of decision block 408 is taken and the memory write is dropped in block 412. Information identifying the source of the memory write to the immutable memory range is captured in block 414, an entry is made into a system error log in block 416, an indication is provided to the information handling system in block 418, and the method ends in block 420.

Figure 5:
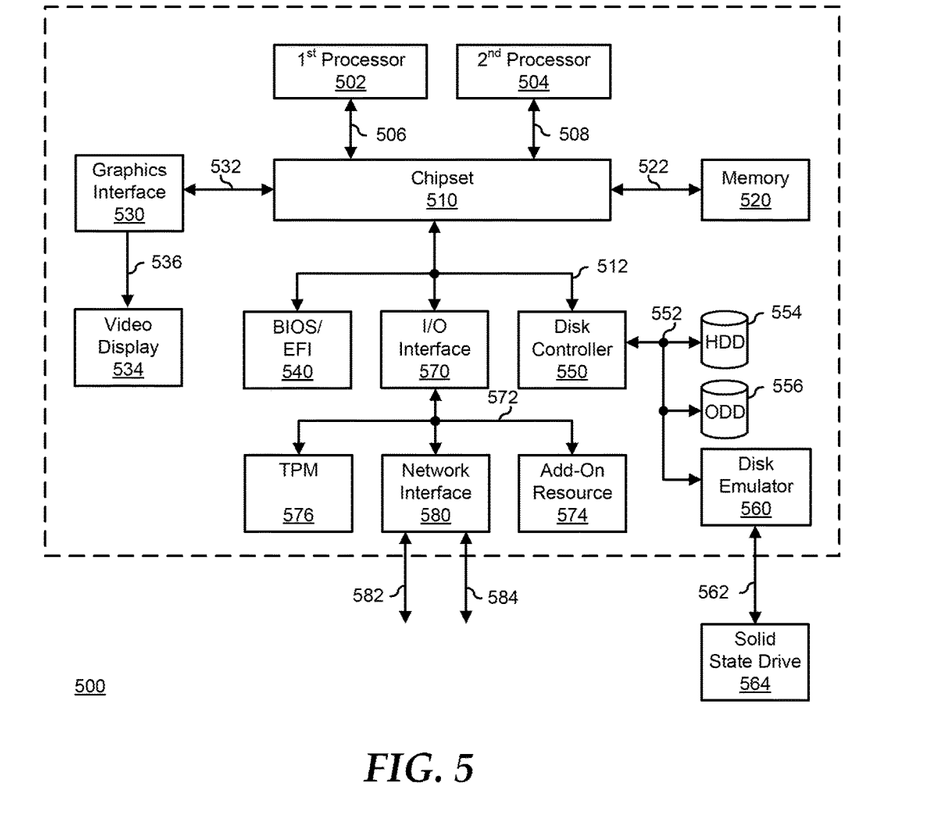
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI)

module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A memory protection module, comprising:
comparison logic coupled to a memory interface and including a window control status register (CSR), wherein:
the window CSR is configured as a rewritable register; and
the window CSR stores a memory address range; and
window protection logic coupled to the memory interface;
wherein the comparison logic:
receives a memory write transaction from the memory interface;
determines a memory address of the memory write transaction;
provides a first indication as to whether or not the memory address is included in the memory address range;
clears the window CSR in response to a reset of the memory protection module;
receives the memory address range in response to the reset;
stores the memory address range in the window CSR in response to receiving the memory address range, wherein the window CSR remains rewritable until such time as a separate lock window CSR transaction is received;
receives the lock window CSR transaction; and
locks the window CSR in response to receiving the lock window CSR transaction; and
wherein the window protection logic:
receives the memory transaction from the memory interface;
receives the first indication from the comparison logic;
allows the memory write transaction to proceed in response to the first indication indicating that the memory address is not included in the memory address range; and
drops the memory write transaction in response to the first indication indicating that the memory address is included in the memory address range.

2. The memory protection module of claim 1, wherein the window protection logic further provides a second indication that the memory write transaction has been dropped.

3. The memory protection module of claim 2, wherein the second indication comprises one of a processor interrupt and a machine check exception.

4. The memory protection module of claim 1, wherein the memory address range corresponds to an address range of a memory that stores operating system kernel code.

5. The memory protection module of claim 1, wherein the comparison logic further:
receives a second memory write transaction to re-write the window CSR; and
provides a second indication that the memory protection module received an attempt to re-write the first window CSR.

6. The memory protection module of claim 1, wherein the comparison logic further comprises a plurality of window CSRs, the plurality of window CSRs comprising the window CSR.

7. The memory protection module of claim 1, wherein the window protection logic:
receives a second memory transaction from a direct memory access (DMA) device;
receives a second indication from the DMA device, the second indication being as to whether or not a second memory address of the second memory transaction is included in the memory address range;
allows a second memory write transaction to proceed in response to the second indication indicating that the second memory address is not included in the memory address range; and
drops the second memory write transaction in response to the second indication indicating that the second memory address is included in the memory address range.

8. A method, comprising:
receiving, by comparison logic of a memory protection module, a memory write transaction from a memory interface, wherein the comparison logic is coupled to the memory interface and includes a window control status register (CSR) that is configured as a rewritable register and that stores a memory address range;
determining, by the protection logic, a memory address of the memory write transaction;
providing, by the protection logic, a first indication as to whether the memory address is included in the memory address range;
clearing, by the protection logic, the window CSR in response to a reset of the memory protection module;
receiving, by the protection logic, the memory address range in response to the reset;
storing, by the protection logic, the memory address range in the window CSR in response to receiving the memory address range, wherein the window CSR remains rewritable until such time as a separate lock window CSR transaction is received;
receiving, by the protection logic, the lock window CSR transaction;
locking, by the protection logic, the window CSR in response to receiving the lock window CSR transaction;
receiving, by protection logic of the memory protection module, the memory transaction from the memory interface, wherein the protection logic is coupled to the memory interface;
receiving, by the protection logic, the first indication from the comparison logic;
allowing, by the protection logic, the memory write transaction to proceed in response to the first indication indicating that the memory address is not included in the memory address range; and
dropping, by the protection logic, the memory write transaction in response to the first indication indicating that the memory address is included in the memory address range.

9. The method of claim 8, further comprising:
providing, by the window protection logic, a second indication that the memory write transaction has been dropped.

10. The method of claim 9, wherein the second indication comprises one of a processor interrupt and a machine check exception.

11. The method of claim 8, wherein the memory address range corresponds to an address range of a memory that stores operating system kernel code.

12. The method of claim 8, further comprising:
receiving, by the comparison logic, a second memory write transaction to re-write the window CSR; and
providing, by the comparison logic, a second indication that the first memory protection module received an attempt to re-write the window CSR.

13. The method of claim 8, wherein the first comparison logic further comprises a plurality of window CSRs, the plurality of window CSRs comprising the window CSR.

14. The method of claim 8, wherein the window protection logic:
receiving, by the window protection logic, a second memory transaction from a direct memory access (DMA) device;
receiving, by the window protection logic, a second indication from the DMA device, the second indication being as to whether or not a second memory address of the second memory transaction is included in the memory address range;
allowing, by the window protection logic, a second memory write transaction to proceed in response to the second indication indicating that the second memory address is not included in the memory address range; and
dropping, by the window protection logic, the second memory write transaction in response to the second indication indicating that the second memory address is included in the memory address range.

15. A memory protection module, comprising:
comparison logic coupled to a memory; and
window protection logic coupled to a memory interface;

wherein the comparison logic:
    receives a memory write transaction from the memory interface;
    determines a memory address of the memory write transaction;
    provides a first indication as to whether or not the memory address is included in a memory address range;
    clears a window CSR in response to a reset of the memory protection module;
    receives the memory address range in response to the reset;
    stores the memory address range in the window CSR in response to receiving the memory address range, wherein the window CSR remains rewritable until such time as a separate lock window CSR transaction is received;
    receives the lock window CSR transaction; and
    locks the window CSR in response to receiving the lock window CSR transaction; and
wherein the window protection logic:
    receives the memory transaction from the memory interface;
    receives the first indication from the comparison logic;
    allows the memory write transaction to proceed in response to the first indication indicating that the memory address is not included in the memory address range; and
    drops the memory write transaction in response to the first indication indicating that the memory address is included in the memory address range.

16. The memory protection module of claim 15, wherein the first window protection logic further provides a second indication that the memory write transaction has been dropped.

17. The memory protection module of claim 16, wherein the second indication comprises one of a processor interrupt and a machine check exception.

18. The memory protection module of claim 15, wherein the memory address range corresponds to an address range of a memory that stores operating system kernel code.

19. The memory protection module of claim 15, wherein the window protection logic:
    receives a second memory transaction from a direct memory access (DMA) device;
    receives a second indication from the DMA device, the second indication being as to whether or not a second memory address of the second memory transaction is included in the memory address range;
    allows a second memory write transaction to proceed in response to the second indication indicating that the second memory address is not included in the memory address range; and
    drops the second memory write transaction in response to the second indication indicating that the second memory address is included in the memory address range.

* * * * *